April 19, 1960 J. G. WRIGHT ET AL 2,933,242
MECHANICAL TRIANGLE SOLVING MECHANISM
Filed Oct. 1, 1954 9 Sheets-Sheet 1

INVENTOR
JERAULD G. WRIGHT &
DOUGLAS S. L. DURIE
By Smart & Biggar
ATTORNEYS

April 19, 1960  J. G. WRIGHT ET AL  2,933,242
MECHANICAL TRIANGLE SOLVING MECHANISM
Filed Oct. 1, 1954  9 Sheets-Sheet 3

Fig. 4.

INVENTOR
JERAULD G. WRIGHT &
DOUGLAS S.L. DURIE
By Smart & Biggar
ATTORNEYS

April 19, 1960

J. G. WRIGHT ET AL 2,933,242

MECHANICAL TRIANGLE SOLVING MECHANISM

Filed Oct. 1, 1954

INVENTOR
JERAULD G. WRIGHT &
DOUGLAS S.L. DURIE.
ATTORNEYS

FIG. 9.

United States Patent Office 2,933,242
Patented Apr. 19, 1960

2,933,242
MECHANICAL TRIANGLE SOLVING MECHANISM

Jerauld George Wright, Ottawa, Ontario, and Douglas S. L. Durie, Toronto, Ontario, Canada, assignors to Her Majesty the Queen in the right of Canada as represented by the Minister of National Defence Application October 1, 1954, Serial No. 459,574

13 Claims. (Cl. 235—61)

This invention relates to computing mechanisms and more particularly to an improved device of the analogue triangle type wherein a mechanical triangle is constrained to conform to input data representing two sides and the included angle thereof and arranged to produce as output any of the unknown values of said triangle which is thus constrained.

Analogue triangle computers are well known and in various forms have been used for the solution of navigational problems with the mechanical parts of the analogue representing the so-called "navigator's triangle." The simplest form of such device which has been used widely in aeronautical navigation consists simply of a manually adjustable analogue triangle with sides representing air speed, ground speed and wind speed. The air speed side is suitably scaled and adjustable in length and at the one end has pivoted thereto the wind velocity side which carries an adjustable pin. To the other end of the air speed side is pivoted the ground speed arm which is provided with a longitudinal slot within which the pin on the wind speed arm is freely slidable. The computer is further provided with suitable means whereby the angle between the air speed side and the wind speed side (the wind angle) can be set to correspond with the known wind angle and suitable scales are provided along the slot in the ground speed arm to enable the ground speed to be read off by an operator and a protractor device is provided enabling the angle between the ground speed side and the air speed side (the drift angle) also to be read off by an operator.

The above-described computer requires a skilled operator for its use and involves a time delay between the reception of air speed and wind speed and direction data and the indication of the resultant ground speed and drift angle. Such delays are not acceptable in the navigation of modern high-speed aircraft because of the error thus introduced, and the necessity for the presence of a navigator imposes an undesirable limitation on the design of the aircraft itself. It has, therefore, been proposed on many occasions that the computer should be mechanized to a sufficient extent to enable all the navigation to be done by the pilot whereby all that would be necessary for him to do would be to set wind velocity and wind direction data on suitable dials mounted on his instrument panel.

While the mechanical triangle above described has great advantages from the point of view of simplicity, lightness of weight and accuracy, various problems are involved in feasibly operating it mechanically because of the fact that in certain positions the mechanism becomes locked in position and cannot then be moved to another position without application of externally applied force.

Accordingly, in the past, such efforts as have been made to produce an automatic triangle computer have been primarily directed to the solution of triangular problems by electrical rather than by mechanical means.

The present invention has as its principal object the provision of a mechanical triangle suitable for use within an aeronautical navigation computer in which the tendency to become locked in certain positions has been eliminated and which is readily constrained to conform to the usual input data, namely air speed, wind speed and wind angle.

Another object of the invention is to provide a mechanical analogue triangle capable of accommodating all triangle shapes and which may thus be used for solving navigational problems where the wind speed side of the triangle is equal to or greater than the air speed side of the triangle, such situations being encountered mainly in the solution of interception problems.

It is a further object of the present invention to produce such a triangle analogue computer which is simple in construction, rugged enough to withstand service conditions and sufficiently accurate to fulfill the purpose for which it is required.

It is a further object of the invention to produce such a triangle analogue computer of small enough size to be mounted in the instrument panel of an aircraft.

Other objects and advantages of the invention will appear from the following detailed specification wherein one embodiment of the invention and the principles upon which it operates are described with reference to the accompanying drawings wherein:

Figure 6 is a schematic illustration of the various components and data links contained in the device illustrated in Figures 3, 4 and 5;

Broadly, the computer of the present invention comprises mechanical analogue triangle means, electrically actuated servo means for constraining two sides and the included angle of said triangle to conform to input values expressed as electrical signals whereby the magnitude of all unknown values in said triangle are fixed, a specially designed output arm assembly, as will hereinafter be described, representing the third side of said triangle and associated with electrical sensing means arranged to sense the length of said third side and/or the magnitude of the angles between said third side and the other two sides of said triangle, and means for producing an output signal from said computer corresponding in magnitude to any or each of said sensed values and expressed either in electrical terms or as a shaft rotation.

Figure 1:
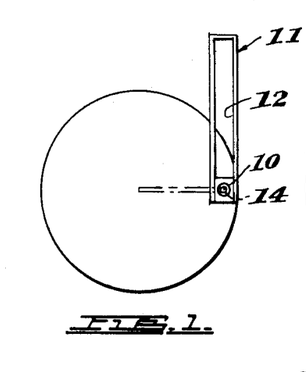
Figure 1 is a diagrammatic representation of a known type of analogue triangle.

The principal difficulty which arises when a mechanical triangle is to be constrained automatically by variation of two sides and the included angle thereof arises from the fact that in certain positions of said two constrained sides the means which constrain them to a given length have no leverage arm on the third side of the triangle whereby to swing it into the position which it must assume to conform to the input data. There are two principal situations in this respect which, together with the means used to deal with them, will be described briefly as follows:

(1) Firstly, referring to Figure 1 wherein a known type of triangle analogue mechanism is illustrated, it will be observed that if a situation occurs such that air speed and wind speed are equal in value and opposite in direction so that their vectors represented in the analogue triangle coincide, the pin 10 riding in the slot of the ground speed arm 11 reaches the end of its travel in the slot 12 and cannot continue its motion until the arm 11 has been swung through 180°. This must be done by external means as there is no leverage arm between the pin 10 and the pivot 14 of the arm 11. This form of locking is prevented in a very simple manner according to the invention by providing two ends for the arm 11 as will be observed from Figure 2. In that case, when the aforementioned locking condition occurs, the pin 20 continues sliding past the pivot 23 and rides out on the end 24 of the arm 21. Since this action eliminates the 180° flip which would have been necessary did the arm not possess the second end 24, the direction represented by the angular position of the arm 24 is the reciprocal of the true direction being represented. This fact is compensated for by a simple reversal of electrical leads each time the pin 20 rides past the pivot 23.

Figure 2:
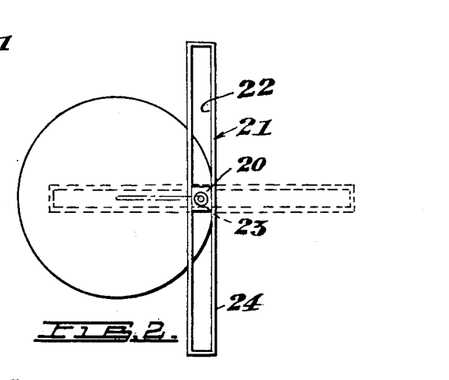
Figure 2 is a diagrammatic illustration of a similar analogue triangle to that illustrated in Figure 1 but equipped with a double ended ground speed arm in accordance with the present invention and illustrating the principle of operation thereof.

(2) Even with the double ended arm mechanism described briefly in (1) above, there is a further situation of jamming which must be provided for; namely, referring to Figure 2, whenever the wind speed arm and the air speed arm coincide and the input requires an alteration in the length of the wind speed or air speed sides of the triangle, the arm 21 will usually be at right angles to the wind speed and air speed arms, and the constraining force acting in the direction of the wind speed or air speed arms cannot cause any sliding motion of the pin 20 in the slot 22. A similar situation can develop if the arm 21 is in coincident relationship to the wind speed and air speed arms instead of being at right angles thereto when the pin 20 and the pivot 23 are coincident. It will readily be observed that in this situation it is impossible to vary wind direction (i.e. the angular position between the wind speed and air speed arms) without swinging the arm 23 through approximately 90°. Both situations are dealt with, according to the invention, by the use of a special spring loaded mounting for the pin 20 which cause it to move off-centre momentarily under the influence of any constraining force as above-mentioned permitting the said constraining force momentarily to have sufficient of a moment arm to swing the arm 21 around into the required position.

Figure 7:
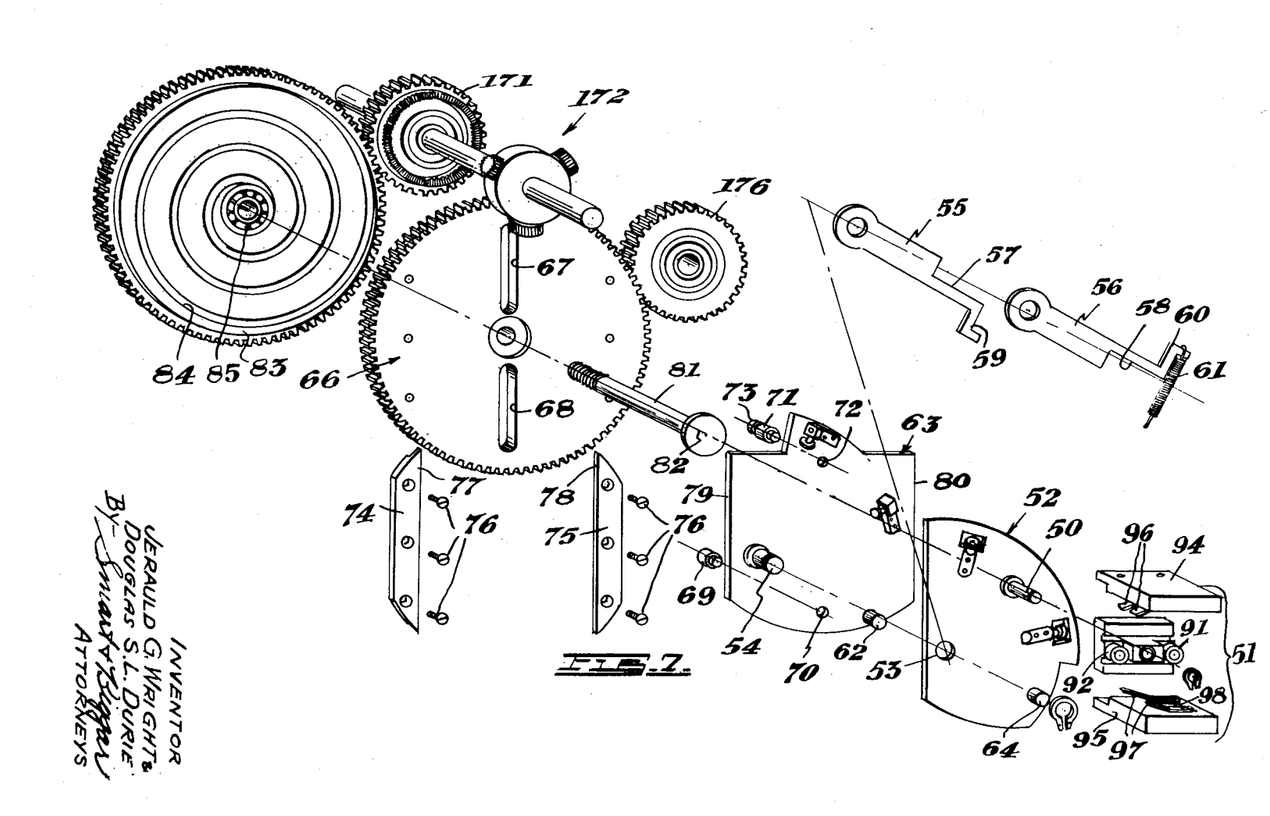
Figures 7 and 8 together represent an exploded perspective view of the components of the mechanical triangle contained in the device illustrated in Figures 3, 4 and 5, with the connecting electrical circuit illustrated schematically.
Figure 8:
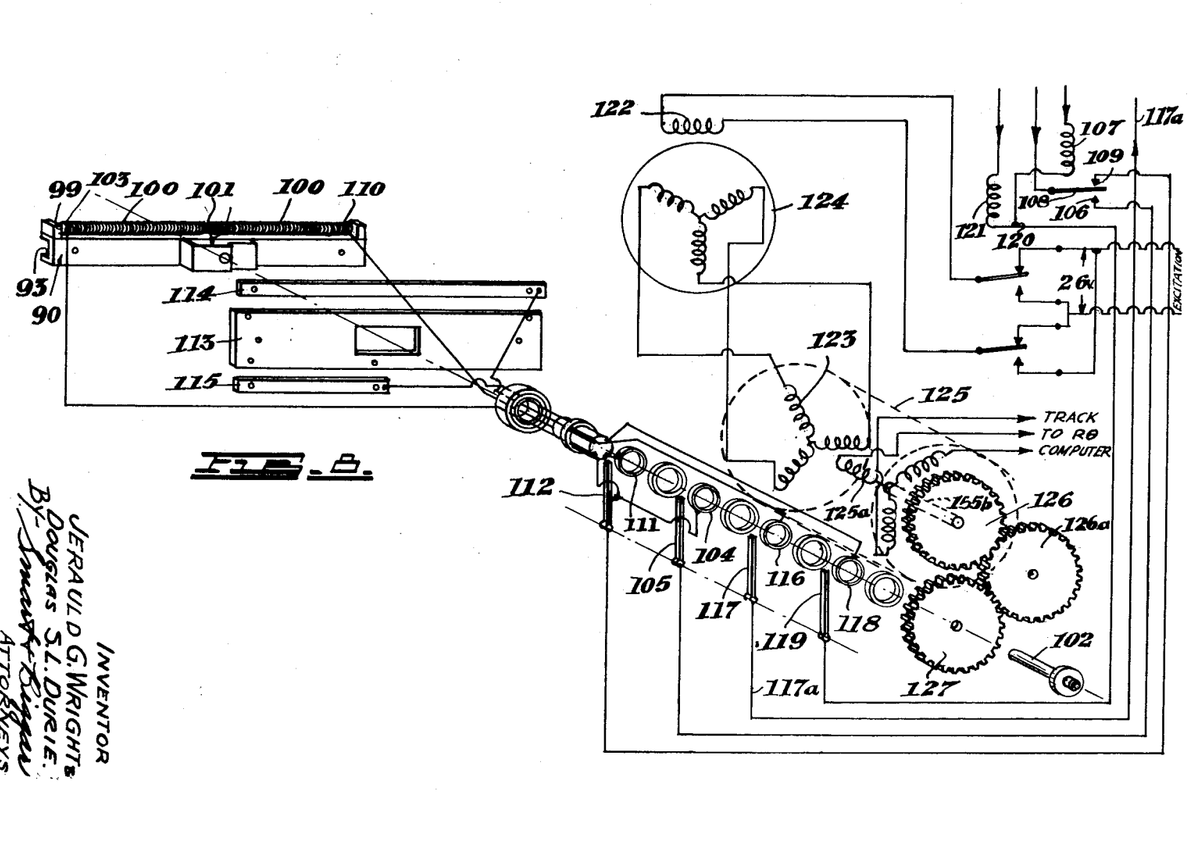

The analogue triangle of the present invention is illustrated diagrammatically in Figures 7 and 8 which together represent an exploded perspective of the triangle mechanism.

Referring first of all to Figure 7, the pin 50 provides pivotal mounting for the cursor 51 and represents one apex of the analogue triangle. The pin 50 is secured to the plate 52 which is provided with the hole 53 through which the post 54 extends. On the end of the post 54 which protrudes through the hole 53 are mounted the arm members 55 and 56 having cut-away portions 57 and 58 and portions 59 and 60 adapted to mount the tension spring 61 whereby, when in assembled position, the cut-away parts 57 and 58 bear against the stud 62 of the plate 63 and the stud 64 in the plate 52 and normally hold the plate 52 and the plate 63 in fixed relationship. Suitable ball bearings are provided mounted on the plate 63 and riding against the plate 52 to insure maintenance of the spaced relationship between the two plates during pivoting of the plate 52 on the post 54, and additional ball bearing means mounted on the plate 52 and extending through holes therein to bear against the plate 63 are provided to maintain the plate 52 in parallel relationship to the plate 63 throughout any pivotal motion.

The plate 63 is adapted to lie against the gear wheel 66 which is provided with the diametrically arranged slots 67 and 68 into the latter of which the stud 69, which is mounted in the hole 70 of the plate 63, fits slidably and through the former of which the stud 71, which is mounted in the hole 72 in the plate 63, extends carrying on its end the ball bearing 73. The plate 63 is retained in slidable relation to the gear 66 by means of the retaining plates 74 and 75 which are screwably secured to the gear wheel 66 by the screws 76 with respective flange portions 77 and 78 extending over the edges 79 and 80 respectively of the plate 63, permitting the latter to slide freely in alignment with the diametrical slots 67 and 68 to an extent limited by the abutment of the studs 69 and 71 against the ends of the slots 67 and 68.

It will be observed that the arrangement of the spring retained pivotally mounted arms 55 and 56 is such that any force urging the pin 50 in a vertical or horizontal direction will tend to rotate the plate 52 with respect to the plate 63 about the post 54 against the tension of spring 61. Referring to Figure 2, it will be observed that the locked position illustrated in solid lines, in accordance with the explanation already given requires the ground speed arm 21 to move to the dotted line position to enable relative increase or decrease of air speed or wind speed without change of wind angle. Similarly, in the locked position represented by the dotted line position of arm 21, the arm must move to the solid line position to enable change of wind angle without change of air speed or wind speed. A relative change of air speed and wind speed with the ground speed arm 21 in the solid line position, or a change of wind angle with the ground speed arm 21 in the dotted line position will exert respectively a horizontal or a vertical force upon the pivot pin 50, in either case rotating the plate 52 around the post 54 against the tension of the spring 61. This moves the pin 50 to one side or the other a sufficient distance to provide enough of a moment arm for the applied constraining forces to swing the ground speed arm around to the required position and prevent the triangle from becoming locked. As the ground speed arm swings around, the spring 61 reasserts itself, bringing the pin 50 back into properly related position with respect to the axis 82. The deflection of pin 50 is small and is only momentary, and there is thus no interruption in the continuous flow of output data as a result of its movement. It will be obvious that the line joining post 54 and pin 50 should be at 45° to the horizontal in order to provide for uniformity of action as between the two locked positions of the triangle. It will be equally apparent, however, that the arrangement would function effectively over a considerable range of relative positions of the post 54 and the pin 50. As the locked positions of the triangle can only occur when air speed and wind speed are equal, and wind angle is 0°, it will be apparent that in normal operation locking will virtually never occur. In interception problems the possibility of locking is greater, since the wind speed arm then represents the speed of the target aircraft and there will be danger that locking conditions will occur whenever the intercepting aircraft and the target are flying the same course. However remote the possibility of locking conditions is, it is essential that the possibility be entirely removed since the locking of the triangle even temporarily can damage the instrument in some cases, and will always result in the introduction of considerable error in the output data of the instrument.

The wind direction gear 66 is rotatably mounted on the axis pin 81, the central axis 82 of which represents the second apex of the triangle.

The second wind speed gear 83 is also mounted on the axis pin 81, is similar in size and shape to the gear wheel 66 and is provided on its inner face with the spiral scroll 84 into which the ball bearing 73 on the pin 71 extends. The wind speed gear 83 is also provided with an anti-friction ball bearing 85.

It will readily be seen that if the wind speed gear 83 is rotated relatively to the gear wheel 66 which it lies against, the ball bearing 73 riding in the scroll 84 will move the plate 63 radially with respect to the wind direction gear 66. The distance of the centre of the pin 71 from its zero position (which corresponds to the radial distance from the centre of mounting pin 50) to the central axis 82 of the axis pin 81 is the analogue of wind speed, and it is varied or set into the analogue triangle by rotating the gear wheel 83 relatively to the wind direction gear 66. The pin 50 is normally in fixed position relative to the pin 71, and only moves out of such position momentarily on rare occasions when the above-described anti-locking features of the triangle come into play. The pin 50 has the cursor 51 pivotally mounted upon it, and its axis represents one apex of the analogue triangle. Wind direction on the other hand is varied or set in by rotating the wind direction gear 66 and the wind speed gear 83 together so that the angular disposition of the slots 67 and 68 is changed without altering the position of the plate 63 with respect to the wind direction gear 66. The mechanism just described is the wind vector mechanism and wind speed and wind direction are fed in by appropriate rotation of the gears 66 and 83 as will be described later on.

Figures 10, 11:
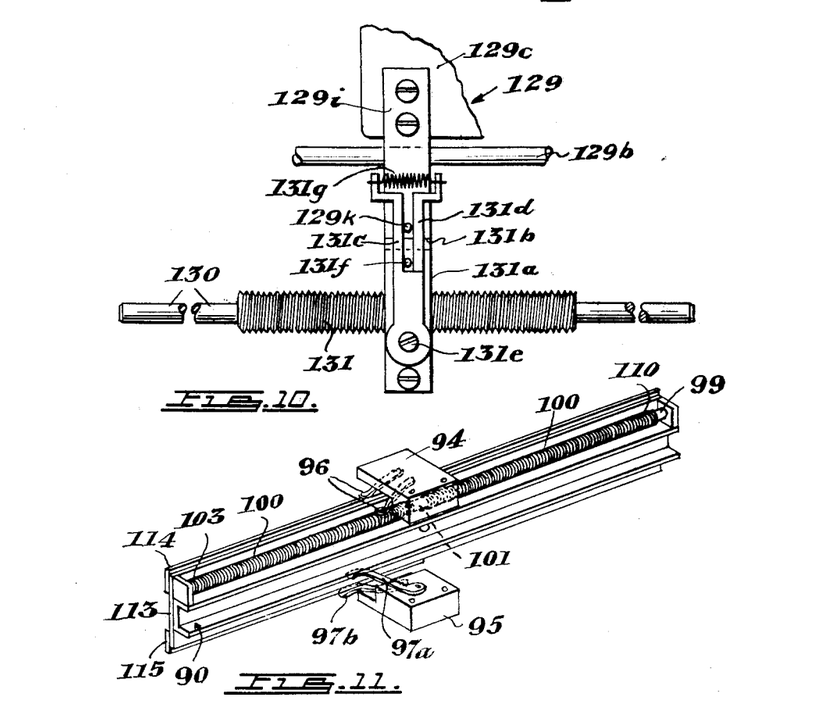
Figure 10 is a detail showing the construction of the air speed assembly which represents the air speed arm of the mechanical triangle.
Figure 11 is a detail illustrating the construction of the ground speed or output arm of the mechanical triangle of the invention.

The cursor 51 is adapted to ride freely on the channel arm 90 (see Figure 8) with the ball bearings 91 and 92 riding within the channel 93. The cursor has mounted upon it the insulating blocks 94 and 95 formed from suitable material (such as Bakelite) each of which is provided with a pair of electrical brushes 96 and 97 respectively, the brushes of each pair being connected together as at 98. Surrounding the mandrel 99 (see Figures 7, 8 and 11) which is mounted longitudinally along one side of the arm 90, is the potentiometer coil 100. The potentiometer coil 100 is grounded at its central point 101 to the channel arm 90 which is itself grounded to the frame of the instrument through the pivot pin 102 upon which it is mounted. The end 103 of the potentiometer coil is connected through slip ring 104 and brush 105 to the contact 106 of the relay 107. The movable contact 108 carries a stabilized voltage of approximately 30 volts which is provided from a suitable source and applies it either to the contact 106 or the contact 109 depending upon the position of relay 107. As will be observed, the end 110 of the potentiometer coil 100 is connected through the slip ring 111 and the brush 112 to the contact 109. It will be observed that with the contact 108 in the position illustrated in Figure 3, the end 110 of the potentiometer coil 100 will be energized.

Secured to the channel arm 90 is the back plate 113 which is made of suitable insulating material such as Bakelite (urea formaldehyde resin), Lucite (methyl methacrylate resin), or some other suitable material having the required insulating properties and dimensional stability. This plate 113 carries the contactor bars 114 and 115, the former of which extends the entire length of the arm 90, but the latter of which extends only half the length of the arm 90 and terminates precisely at the centre of the arm. As will be observed, the contactor bar 114 is connected through the slip ring 116 and the brush 117, to the output line 117a which consequently carries a voltage proportional to the distance of the point of contact of contactor bar 96 from point 101.

The other contactor bar 115 is connected through the slip ring 118 and the brush 119 to the junction point 120 through which each of the solenoid operated relays 107 and 121 are connected to the 28 volt supply. Whenever the brushes 97 are on the end of the arm 90 which carries the contactor bar 115, the brush 97b will establish contact with the contactor bar 115 while the brush 97a will remain in direct contact with the channel arm 90 which, as already mentioned, is grounded.

This grounds the junction point 120 and energizes both the relays 107 and 121. Energizing of the relay 107 ensures that the correct end of the potentiometer coil 100 is provided with voltage, while energizing of the relay 121 causes reversal of the excitation of the windings 122 of the true heading transmitter synchro 124. This reversal of excitation produces 180° shift in the angle transmitted to the fixed windings 123 of the drift differential syncho 125 and produces the same effect as swinging the arm 90 through 180°. The movable winding 125a of the drift differential syncho 125 is mounted on shaft 125b which is connected through gears 126, 126a and 127 to the pin 102 upon which the channel arm 90 is fixedly mounted. The angular position of the movable windings 125a therefore corresponds to the angular position of the arm 90 and the output signal transmitted by the drift differential synchro 125 will always correspond to true heading plus the angle between the ground speed and air speed arms of the analogue triangle (which is "track").

The pivot pin 102 is pivotally secured in the hole 102a to a carriage 129 (see Figures 6 and 10), and its axis point represents the third apex of the analogue triangle. The distance between the axis of the pin 102 and the axis 82 of the axis pin 81 is the analogue of air speed, and it is set into the analogue triangle simply by rotating the shaft 130 which is rotatably mounted on the frame of the instrument thus advancing the carriage 129 or retracting it along the slide bars 129a and 129b.

The carriage 129 consists of the plate 129c and the plate 129d which are maintained in closely juxtaposed spaced relationship by means of the three pillar bolts 129e, 129f and 129g. The plates 129c and 129d are suitably adapted to accommodate the gears 126a and 127 while the drift angle differential synchro 125 is secured to the plate 129c with its shaft extending therethrough and having the gear 126 mounted thereon. The carriage 129 is suspended on the slide bars 129a and 129b by means of the bushing 129h which is slidably mounted on the slide bar 129a and the bushings 129i and 129j which are slidably mounted on the slide bar 129b, all of which bushings are secured to the plate 129c. The bushing 129i is specially adapted to cooperate with the nut member 131a which rides on the screw threaded portion 131 of the shaft 130 (see Figure 10). The bushing 129i and the nut member 131a meet with a tongue and groove at 131b. This tongue and groove is parallel to the longitudinal axis of the shaft 130. The bushing 129i and the nut member 131a are retained in indexed relationship by spring retaining means consisting of the arms 131c and 131d, each of which is pivotally mounted about the screw 131e. These arms embrace the pin 131f which protrudes from the nut member 131a and the pin 129k which protrudes from the face of the bushing 129i. The ends of the arm members 131c and 131d are retained together by the tension spring 131g. One purpose of the spring mounting arrangement just described is to prevent damage to the instrument if the limit of travel of the carriage 129 is exceeded. This is unlikely to happen during normal operation but can occur when the instrument is set up for bench tests in association with flight simulating means. When such conditions occur, the spring 131g will permit limited relative movement of the nut member 131a and the bushing 129h. In addition, it may be desirable to place limit switches at each end of the run of the carriage 129 to shut off the true air speed follow up servo motor which drives the shaft 130 in a manner to be described later whenever the limit of travel of the carriage 129 tends to be exceeded.

The spring mounting arrangement has, however, a further and more important function. When the wind angle is zero and wind speed equals airspeed, and when the position of the ground speed arm is such, and the direction of the constraining forces are such that there is little or no moment created by the pivot pin 50 (see Figure 7) about the pivot post 54, the pivot pin 50 will not be displaced transversely against the bias of spring 61 to create a moment arm and cause the ground speed arm to be swung into a position enabling further restraint of the triangle. When this condition occurs, the constraining forces will cause the bushing 129i to be displaced relatively to the nut member 131a against the bias of spring 131g, thus momentarily increasing the length of the airspeed side of the triangle and providing a moment arm by means of which the ground speed arm may be swung out of its locked position. In addition, a non-rigid relative constraint of the type provided by the above-described spring mounting has been found to have practical usefulness in protecting the lightly constructed arm against damage due to the considerable forces generated when the pivoting action of the plate 52 relative to plate 63 flips the ground speed arm out of the jammed position. Also this construction eliminates binding of the carriage which may be caused by lack of exact parallelism between slide bar 129b and screw 131.

The requisite data may be fed into the analogue triangle thus far described in several different manners depending upon what sources of data are immediately available. Similarly, the outputs from the analogue triangle which are on the one hand a direct current voltage proportional to ground speed and on the other hand a synchro signal analogous to drift angle may be utilized in the form in which they are produced or converted to other appropriate forms depending upon the use to which the computer is to be put.

In using the computer of the present invention as an aid to aeronautical navigation, it is contemplated that the computer of the invention will be used in association with the Rθ dead-reckoning computer, which is described in copending application Serial No. 469,355, filed November 17, 1954, now Patent No. 2,911,143, in aircraft which may or may not be equipped with Döppler radar. In such case, the ground speed is required in the form of a shaft rotation with r.p.m. proportional to ground speed, whereas the bearing output is required in the form of a shaft position which corresponds to track (i.e. the true bearing on which the aircraft is actually travelling over the ground.)

In the normal case, the aircraft will be equipped with a compass which is arranged to produced an output in terms of a synchro signal which can be used to indicate remotely by means of a synchro receiver and indicator dial. The signal produced by the compass is the analogue of the heading of the aircraft with respect to magnetic north, and accordingly magnetic variation must be added to it to obtain true heading. Wind direction and wind speed will be available from weather reports and possibly from data supplied by radio during flight. Both of these values may, however, be available in the aircraft in somewhat different form if the craft is equipped with Döppler radar which, operating in the Döppler principle transmits a signal to ground and receives a reflected signal from ground. By comparing the transmitted and received signals, an output is obtained which can be converted into the analogues of ground speed and drift angle (i.e. the normal output of the computer of the invention). The Döppler radar, however, at best can produce only an intermittent signal for, due to various factors, its signal is neither continuous nor of constant accuracy. It is one advantage of the present invention that it may be "slaved" to a Döppler radar so that it acts as a memory for the Döppler signals. Certain auxiliary equipment is required for this purpose.

Air speed is normally available from some form of air speed indicator. Preferable for use in association with the computer of the present invention is the Kollsman type true air speed unit. This type of unit is compensated for both altitude and temperature error and produces as output a synchro signal of the same type as is produced by the compass.

Figure 9:
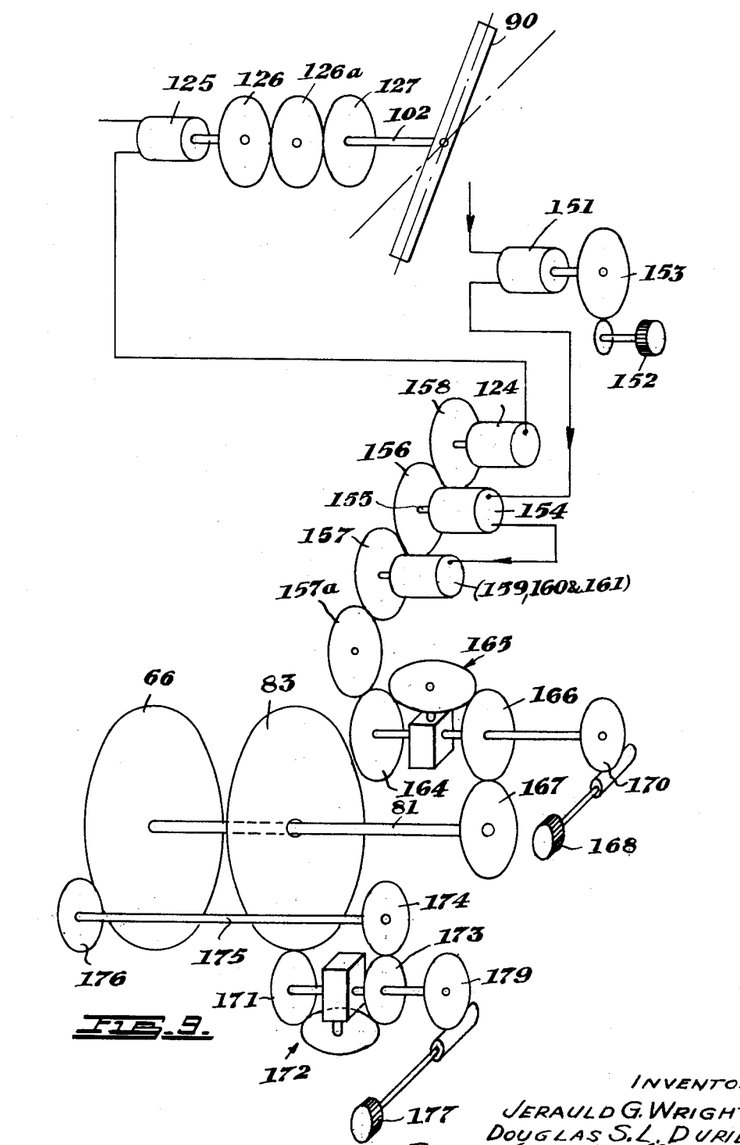
Figure 9 is a schematic illustration of the gear trains contained within the device illustrated in Figures 3, 4 and 5.

A suitable method of operating the mechanical triangle is illustrated in Figure 6 (the gear trains being illustrated in Figure 9). The compass 150 transmits a synchro signal which is received by the differential synchro 151. The differential synchro is connected to the manual knob 152 having an indicator dial 153 by means of which the magnetic variation may be set. The magnetic variation is added algebraically to the magnetic heading in the differential synchro 151 and the output signal transmitted to the control transformer 154 represents true heading. The shaft 155 of the control transformer 154 has mounted upon it the gear 156 which is in mesh with two other gears 157 and 158 with which it has a gear ratio of 1:1. The control transformer 154 compares the actual position of the gear 156 with the position indicated by the incoming signal from the differential synchro 151 and transmits an error signal to the amplifier 159 which applies a voltage to the servo motor 160 causing it to operate in the appropriate direction to reduce the error signal driving the gear 157 through gear box 161 until zero error occurs in the control transformer.

The gear 158 positions the rotor in the true heading transmitter synchro 124 which sends a signal to the drift differential synchro 125 on the output side of the apparatus where drift angle is added to it to produce a final output signal analogous to track as one of the final outputs of the computer.

The gear 157 also meshes through idler 157a with the input gear 164 of the differential 165, the output gear 166 whereof meshes with the gear 167 which drives the wind direction gear 66 by means of shaft pin 81 (see Figure 9). Wind direction in degrees true is set into the differential 165 by the manual knob 168 which carries an appropriate pointer and scale 169 and drives the gear 166 of the differential through the worm and gear 170. Thus, it will be observed that the angular position of the wind direction gear 66 will be the analogue of wind direction in degrees true minus true heading, which, of course, corresponds to wind angle.

The wind speed gear 83 is freely mounted on the shaft 81 and meshes with the output gear 171 of the wind speed differential 172. The input gear 173 of this differential is meshed with the gear 174 which is connected by the shaft 175 to the gear 176 which meshes with the wind direction gear 66. Wind speed is set into the apparatus by means of the manual knob 177 which is provided with a suitable indicator 178 and turns the output shaft of the wind speed differential 172 through the worm and gear 179. It will thus be observed that the effect of turning the manual knob 177 will be to rotate the wind speed gear 83 realtively to the wind direction gear 66. It will also be observed, however, that when the wind direction gear 66 turns it will turn the gear 176 and the gear 174, turing the input gear 173 of the wind speed differential 172, and thus turning the output gear 171 and the wind speed gear 83 a corresponding amount. Thus, a change in the wind angle, which is represented by movement of the gear 66, will not disturb the relative angular position of the gear 66 with respect to the gear 83, and the wind speed analogue remains unchanged unless the manual knob 177 is actuated.

True air speed is suitably provided by a true air speed (Kollsman) unit 181 which provides a synchro signal analogous to true air speed. This is received by the control transformer 182 which carries the gear wheel 183 meshed to the worm 184. The control transformer 182 compares the signal received from the air speed unit 181 with the position of the gear 183 and transmits an error signal which is amplified in amplifier 185 and then drives the servo motor 186 in an appropriate direction, which latter, through the gear box 187, drives the shaft 130 and the worm 184 in the appropriate direction to reduce the error signal to zero. The shaft 130 carries the thread 131 upon which is movably mounted the carriage 129 which carries the ground speed vector assembly. Since true air speed is always applied in the direction of true heading, displacement from zero of the carriage 129 represents the vector of true air speed.

The ground speed signal which is a voltage proportional to ground speed is fed to the amplifier 188 on line 117a and the amplified signal drives servo motor 189 which through gears 190, 191, 192 and 193 drives the output shaft 194 at an r.p.m. which is proportional to ground speed. The r.p.m. of the servo motor 189 is controlled by the D.C. tachometer 195 whose shaft 196 carries the gear 197 which is in mesh with the gear 190 of the servo motor 189.

The servo motor 189 is a two phase motor with fixed phase and a variable phase winding. The D.C. tachometer 195 produces a D.C. voltage proportional to the speed of rotation of the output shaft 194. This voltage is fed into the amplifier 188 where it is compared with the ground speed signal to produce a difference signal, which, after passing through a chopper, is amplified and fed to the variable phase of the motor 189. This means of producing a shaft rotation proportional to a D.C. voltage is conventional and is used inter alia in the conversion of true air speed data into "air miles" in the High Speed Air Position Indicator used by the Royal Canadian Air Force. Specifications for a suitable amplifier may be found in the R.C.A.F. Handbook and parts list for Servo Amplifier Type 106C, issued June 1, 1953. Specifications for a suitable motor 189 and a D.C. tachometer 195 suitable for use herein will be found in the R.C.A.F. Handbook with part list for Velocity Servo Actuator type T243 issued June 1, 1953.

Suitable synchro receivers, control transformers, differentials and transmitters for use in the above-described system are, by way of example, manufactured by the Eclipse-Pioneer Division of the Bendix Aviation Corporation of Teterboro, New Jersey, and illustrated in their file catalogue on High Precision Autosyns under the appropriate headings.

Suitable amplifiers for the synchro controlled servo motors (i.e. the wind direction servo, and the airspeed servo) are described in the R.C.A.F. Handbook with parts list for Servo Amplifier type 105 and 105C issued June 1, 1953.

The system outlined above is, of course, only one of a number of methods by which the computer of the invention may be motivated since it will be appreciated that a different form of servo means can be used in each instance and a different form of electrical analogue signal may be more appropriate than the synchro signal which is used in the illustration and which is, of course, the most convenient signal to use in an aircraft where the incoming information from the compass and the Kollsman true air speed unit are signals of this type. It will be appreciated, moreover, that any additions or subtractions of angles such as are accomplished by the differential synchros 125 and 151 can equally well be carried out mechanically with the use of a mechanical differential.

A further feature of the mechanical triangle of the invention which will be appreciated from the above description is that it is truly a universal triangle solving computer since its analogue system can assume all triangle shapes, and its output systems can directly measure the unknown side and the angle between it and a given side. If the analogue of the third angle of the triangle is desired as output, it will be appreciated that by adding the measured angle to the given input angle and subtracting the total from 180° the third angle can be derived. These operations can easily be carried out with the use of electrical or mechanical differentials.

Similarly, it may be used for solving triangles where the input is two angles of the triangle and one side, rather than two sides and the included angle. In this case, the "given" side will be the side used in the G.S.I.C. as the air speed side, one given angle will be the "wind angle" apex of the triangle, and the other will be the "drift angle." Since the "drift angle" cannot be set directly into the triangle, it must be set indirectly by adding a control transformer to the drift angle synchro assembly and driving either the wind speed or wind directions servos with the error signal until the desired value has been set in. If the computer is to be set up to solve triangles where one of the angles given is not adjacent the given side, then it will be necessary first of all to derive the "drift angle" by subtracting the two given angles from 180°. This can be done with the use of mechanical or electrical differentials. From the foregoing, it will be appreciated that the mechanical triangle of the invention can be arranged to supply the solution to any triangle by appropriate modification of the means used to motivate the various vector assemblies.

Figure 3:
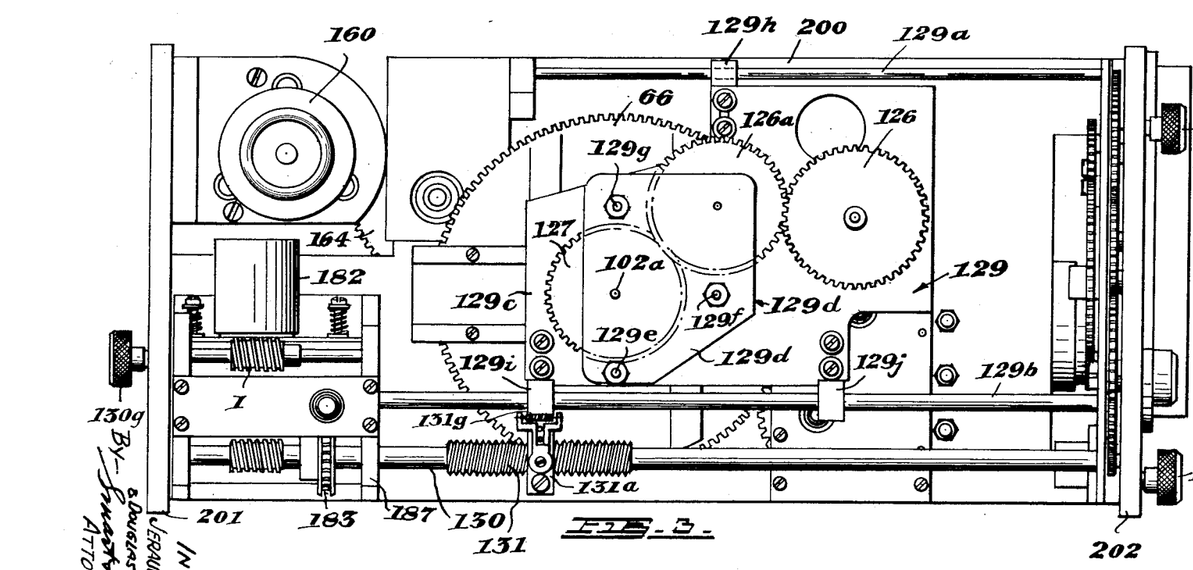
Figure 3 is a side view of a navigational computing device embodying the mechanical triangle of the present invention.
Figure 4:
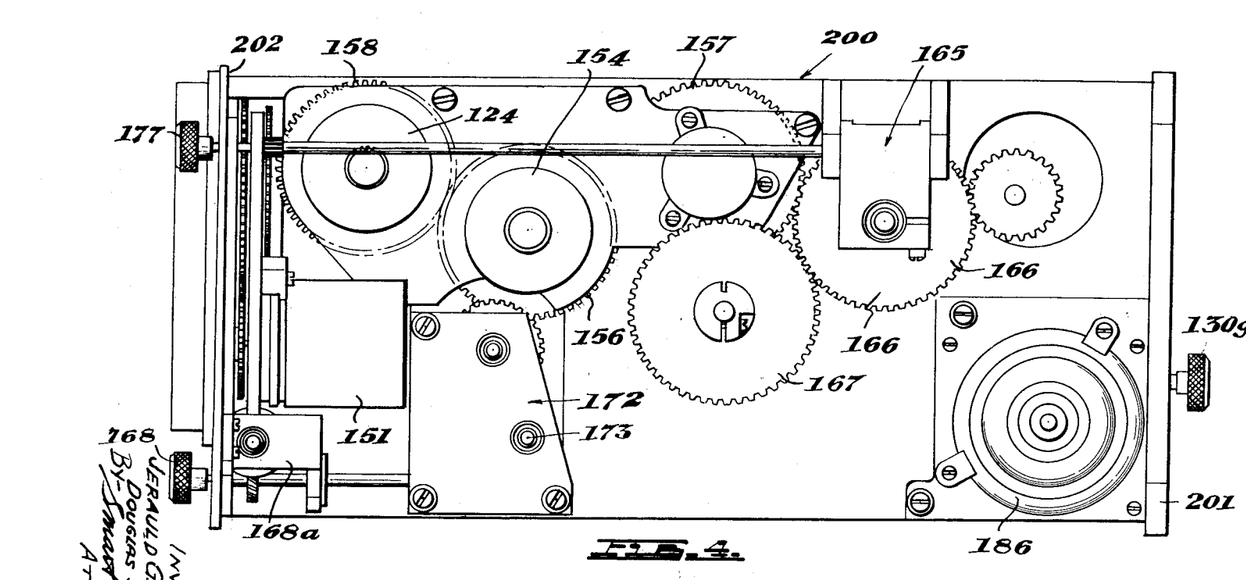
Figure 4 shows the device illustrated in Figure 3 from the opposite side thereof.
Figure 5:
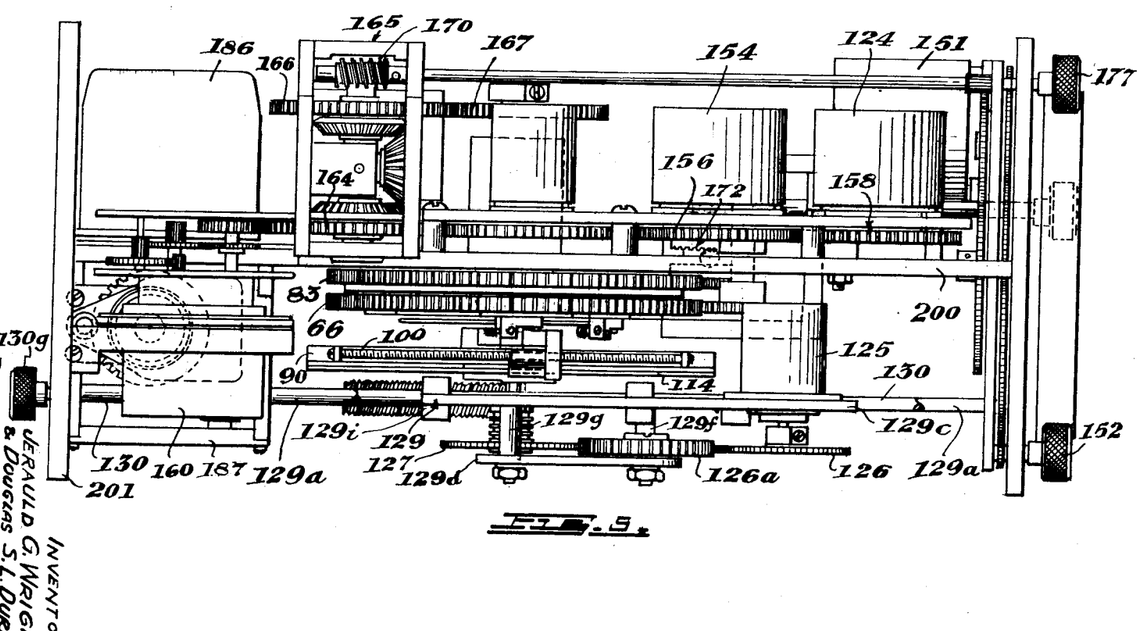
Figure 5 is a top view of the device illustrated in Figures 3 and 4.

Figures 2, 3 and 4 illustrate in top plan and side elevation a ground speed and interception computer embodying the mechanical triangle of the present invention. To illustrate the compactness affordable in instruments embodying the present invention, attention is directed to the fact that these figures are substantially full scale—a scaling down of only about 7% having been necessary in order to accommodate the drawings within the regulation 8" x 11¾" frame.

Referring now to Figures 2, 3 and 4, the computing units are mounted on the heavy frame 200 which forms in effect the backbone of the instrument.

Secured to the heavy frame 200 at right angles thereto is the back plate 201 and the front panel 202. The various components of the instrument thus far described are given the same reference numerals as have previously been used and may be readily identified in Figures 2, 3 and 4. Not thus far described, however, is the presentation on the front panel which is illustrated in detail in Figures 12 and 13.

Figure 12:
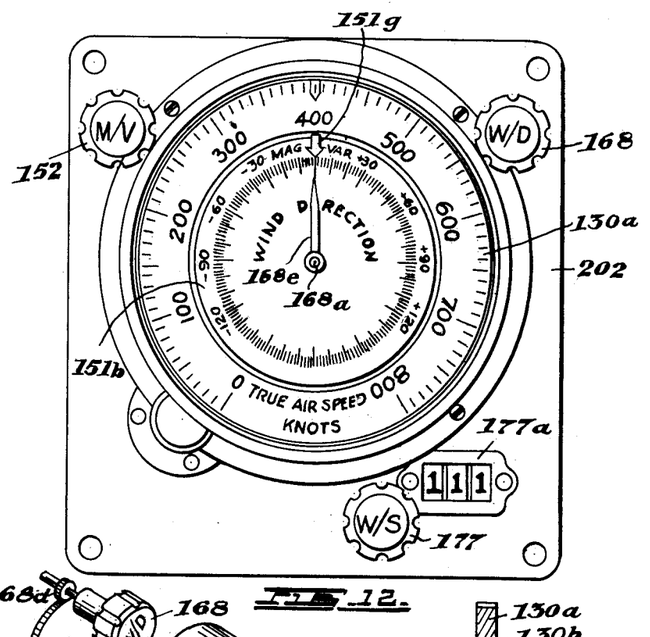
Figure 12 is a front view of the device illustrated in Figures 3, 4 and 5, showing to full scale the presentation of the instrument to the pilot or navigator.

Referring to Figure 12, it will be observed that the three manual knobs marked M/V, W/D and W/S protrude from the front panel 202 of the instrument and are a means by which the magnetic variation, the wind direction, and the wind speed are respectively set into the instrument. It will further be observed that the wind direction and magnetic variation controls have associated with them suitable scales and pointers for indicating their existing setting to the pilot or navigator, whereas the wind speed knob has associated with it a suitable counter indicating the wind speed set into the instrument in knots. It will also be observed that the presentation includes a true air-speed indicator. This consists of the air speed indicator ring 130a which is rotatably suspended from the front panel of the instrument on three spring mounted rollers 130b. The outer periphery of the indicator ring 130a is provided with gear teeth and is in mesh with the pinion 130c which is mounted on shaft 130d upon which is also mounted the gear 130e. The latter gear is driven by the drive pinion 130f which is mounted on the end of the true air speed shaft 130.

Figures 13, 13A:
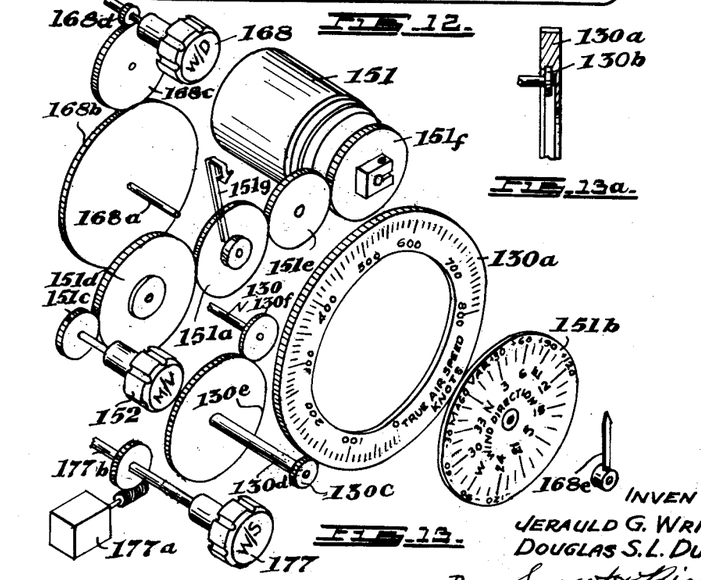
Figure 13 is an exploded perspective illustrating the various gear trains involved in the presentation depicted in Figure 12.
Figure 13a is a fragmentary detail of one of the adjustable roller means for mounting the annular air speed indicator dial concentric with the wind direction dial so that it may rotate freely around it.

Extending from the back plate 201 of the instrument is the adjusting knob 130g by means of which the true air speed system including shaft 130 may be set for zeroing purposes. In the centre of the air speed indicator ring 130a is the wind direction indicator shaft 168a which is secured to the gear 168b, which latter gear is driven by the wind direction knob 168 through the reduction gearing 168c and 168d. Secured on the shaft 168a in front of the front face of the dial is the wind direction pointer 168e. Rotatably mounted on the shaft 168a is the gear 151a to which is secured the magnetic variation pointer 151g. The gear 151a is driven by the magnetic variation knob 152 through gears 151c and 151d. Also meshed with the gear 151a is the gear 151e which drives the gear 151f which is mounted on the shaft which carries a movable coil of the magnetic variation differential synchro 151. Magnetic variation is set on the fixed scale 151b by rotating the knob 152 until the pointer 151g indicates the correct magnetic variation on the scale 151b. Wind direction is set by turning the knob 168 to position the pointer 168e opposite the correct bearing (in degrees true) corresponding to the wind direction. Wind speed on the other hand is set into the instrument by turning the wind speed knob 177 until the counter 177a displays the wind speed in knots. This rotates the wind speed shaft 177b driving the input gear 170 of the differential 165 to the correct position to add wind speed to the vector mechanism within the computer.

It will be observed that during operation the pilot or navigator will be continuously supplied with an indication of true air speed, an indication of the magnetic variation set in the instrument, and an indication of the settings of wind direction and wind speed which are in the instrument. From time to time during flight, fresh information as to wind direction and wind speed may be supplied from a ground station by radio and these are then set by making appropriate corrections to the indicator scales by manually turning the appropriate knobs. Magnetic variation will be available from maps or charts available within the aircraft and from time to time correction will be made by making the appropriate adjustment of the magnetic variation knob 152.

What we claim as our invention is:

1. An analogue triangle computer comprising a frame; a carriage mounted in slidable relation to the frame; an arm member pivoted about its central point on said carriage to pivot in a plane parallel to the direction of slidable motion of said carriage; a cursor mounted on said arm and freely slidable from one end past the central point to the other thereof; a vector mechanism secured to said frame and comprising a mounting pin upon which said cursor is pivotally mounted, and means for adjusting the position of said mounting pin with respect to a datum point whereby a line joining said datum point and said mounting pin represents a desired vector; said datum point, said central point of said arm member, and said mounting pin representing the three apices of an analogue triangle and being so disposed that the displacement of said carriage from a zeroed position represents one known side of said triangle, the distance from said datum point to said mounting pin represents another known side of said triangle, and the angular disposition of the line joining said datum point to said pivot pin with respect to the direction of displacement of said carriage represents the known included angle between said two sides of said triangle, whereas the distances from the central point of said arm member to said mounting pin represents the unknown side, and the angular disposition of said arm with respect to the direction of displacement of said carriage represents an unknown angle of the triangle which it is desired to ascertain; constraining means for constraining said carriage and said vector mechanism to positions corresponding to input values fed into said computer, said constraining means comprising spring restained mounting means for said mounting pin including, a first spring restrained means arranged to permit spring restrained movement of said mounting pin at an angle of approximately forty-five degrees to an imaginary line joining said datum point and said mounting pin, and a second spring restrained means arranged to permit spring restrained displacement of said arm member in a direction having a substantial longitudinal component.

2. An analogue triangle computer as defined in claim 1 in which said constraining means for constraining said vector mechanism comprises spring biased mounting means for said mounting pin arranged to permit limited spring restrained movement thereof at approximately a forty-five degree angle to an imaginary line joining said datum point and said mounting pin, and said constraining means for constraining said carriage comprises spring biased means for permitting limited spring resisted longitudinal movement of said carriage from its restrained position.

3. An analogue triangle computer as defined in claim 1 wherein said vector mechanism comprises; a first gear wheel rotatably mounted upon an axis passing through said datum point, said gear wheel having a spiral scroll on one face thereof; a second gear wheel adjacent the side of said first gear wheel having said spiral scroll, said second gear wheel being rotatable on the same axis as and having the same diameter as said first gear wheel and being formed with a radial slot; a first plate member adapted to lie against the face of said second gear wheel remote from said first gear wheel; guide means for said first plate member secured against said face of said second gear wheel arranged to guide said plate in slidable movement parallel to the direction of said slots; cam follower means secured to said first plate and extending through said slot into engagement with said spiral scroll; whereby relative rotation of said gear wheels causes radial displacement of said first plate as said cam follower follows said scroll; a pivot post mounted on the side of said plate remote from said second gear wheel; a second plate pivotally mounted on said post in closely spaced juxtaposed relation to said first plate; said mounting pin being mounted on the face of said second plate remote from said first plate in a position, when the vector mechanism has no vector set into it, aligned with axis of rotation of said gear wheels and spring retaining means for said second plate arranged to retain the latter in a fixed position during normal operation of said computer but to permit limited rotation of said second plate relative to said first plate against spring pressure to shift the position of said mounting pin momentarily to prevent locking of said computer elements from occuring in certain instances when the cursor happens to be positioned at the centre of the arm member and the arm member is disposed at right angles to the direction of the constraining force being applied.

4. An analogue trinagle computer as defined in claim 3 wherein said spring retaining means comprises a pair of retaining arms pivotally mounted on said pivot post, a first stud mounted on said second plate and a second stud mounted on said first plate and extending outwardly beyond said second plate, said second plate being cut away to accommodate said second stud; said arms being adapted to embrace both said studs between them and being provided with spring mounting means at their outer ends; and a tension spring biasing the ends of said retaining arms toward each other whereby the said two studs are embraced between said arms and retained in aligned position by the bias of said spring.

5. An analogue triangle computer as defined in claim 3 wherein the means for measuring the length of the vector represented by the distance from the central point of the arm member and the mounting pin on which the cursor is mounted comprises; a potentiometer coil mounted on said arm member and extending lengthwise thereof, said potentiometer coil being grounded at a point corresponding to the central point of said arm member; means providing alternative electrical connection between each end of the potentiometer and a source of regulated D.C. voltage; a first contactor carried by said cursor and arranged to contact said potentiometer at a point corresponding to the position of said mounting pin throughout movement of said cursor during operation of said computer; a first contact bar insulated from said arm member and secured in position running lengthwise thereof; means providing electrical connection between said first contact bar and output means arranged to express the distance being measured in desired form as output data; a second contactor electrically connected to said first contactor and carried by said cursor, said second contactor being arranged to contact said first contact bar throughout movement of said cursor during operation of said computer; a second contact bar insulated from said arm member and extending from a point corresponding to the centre of said arm to one end thereof; switch means arranged to control the end of said potentiometer coil to which said regulated voltage is applied; a relay arranged to control said switch means; means providing electrical connection between said second contact bar and the ground lead of said relay; a third contactor on said cursor arranged to contact said second contact bar whenever said cursor is on the corresponding end of said arm member; and a fourth contactor electrically connected to said second contactor and arranged continuously to contact a grounded metallic portion of said arm, whereby said relay is connected to ground whenever said cursor is on the end of the arm member which carries said second contact bar and throws said switch means to a position where the controlled voltage is applied to the end of the potentiometer on the end of the arm member where the cursor is situated, whereas when the cursor rides back on to the other end of said arm member, said relay falls out to apply said controlled voltage to the other end of said potentiometer coil.

6. An analogue triangle computer as defined in claim 3 wherein the means for measuring the direction of the vector represented by the line joining said central point on said arm to said mounting pin comprises; a synchro transmitter arranged to transmit a synchro signal constituting a datum to which said direction may be compared; a synchro differential mounted on said carriage and having a fixed winding to which the output of said synchro transmitter is applied, and a movable winding mounted upon a rotatable shaft; gear means mounted on said carriage and arranged to transmit rotation of said arm member about its central point to said rotatable shaft, whereby said shaft is maintained in angular position corresponding to the angular position of said arm member, and the output of said synchro differential corresponds to the angular position of said arm with respect to said datum; and means in association with said cursor and said arm for reversing the excitation of said synchro transmitter whenever said cursor passes from one side of the central point of said arm to the other to represent change of direction of 180° in the vector being represented by the distance from said central point of said arm to said mounting pin.

7. An analogue triangle computer as defined in claim 6 wherein the means for reversing the excitation of said synchro transmitter comprises; reversing switch means connected in the excitation supply lines of said synchro transmitter; a relay arranged to actuate said switch means to reverse said excitation, and means on said cursor and said arm member and electrically connected to said relay for supplying a ground connection to said relay to hold the latter in whenever the cursor is on one side of the central point on said arm.

8. An analogue triangle computer as defined in claim 3 in which the constraining means for the vector mechanism comprises a control transformer having a movable winding mounted on a rotatable shaft and mechanically connected to said second gear wheel by means of a gear train whereby the angular disposition of said movable winding corresponds to the angular disposition of said second gear wheel, said control transformer having its fixed winding connected to an input to said computer which is the analogue of the vector direction to be represented by the displacement of said carriage means, said control transformer producing as output an error signal; an amplifier arranged to amplify said error signal, servo means arranged to drive said gear train in a direction tending to reduce said error signal to zero; a mechanical differential connected in said gear train between said control transformer and said second gear wheel; means connected to an input gear of said differential for rotating said input gear an amount which corresponds to said known angle of said analogue triangle whereby said second gear wheel is driven to a position corresponding to the direction of the vector represented by the line joining said datum point and said mounting pin; a second mechanical differential having one gear thereof driven by said first gear wheel and a second gear thereof driven through a gear train by said second gear whereby when the third or input gear of said second differential remains stationary said first gear wheel will rotate in the same direction as and through the same angle as does said second gear wheel; means in association with the third or input gear of said second differential for rotating the latter gear an amount which corresponds to the length to be represented by the vector represented by the line joining said datum point to said mounting pin whereby upon rotation of said third or input gear of said differential said first gear wheel is rotated in relation to said second gear wheel and said cam following means follows said spiral scroll moving said first and second plate members to position said mounting pin a radial distance from said datum point which corresponds to the input value carried by said third or input gear of said second differential.

9. An analogue triangle computer as defined in claim 8 wherein the means for constraining said carriage to a position corresponding to an input value to said computer comprises screw means for displacing said carriage in response to the rotation of a shaft having a screw threaded portion thereon; a worm secured upon said shaft; a worm gear in mesh with said worm; a control transformer having a movable winding mounted on a rotatable shaft which carries said worm gear, the fixed winding of said control transformer being arranged to receive an input value which is to be represented by the displacement of said carriage and to produce as output an error signal; an amplifier arranged to amplify said error signal; and servo means arranged to rotate said shaft in a direction tending to reduce said error signal to zero whereby the displacement of said carriage is made to correspond to the input value received by said control transformer.

10. The mechanism defined in claim 8 wherein the spring retained mounting means comprises a first plate member carrying said mounting pin; a second plate member arranged to be moved in accordance with the constraining forces controlling the position of said point, said second plate member being closely adjacent and in juxtaposed relation to said first plate member, and carrying a pivot post upon which said first plate member is pivotally mounted, said post being so positioned that an imaginary line joining it to said point makes an angle of approximately 45° with the direction of any constraining forces which may be applied to said triangle when two sides thereof are coincident; and spring retaining means in association with said first and second plate members arranged to bias said first plate member about said pivot post and retain it in a position where said point coincides with the axis of said pivot post.

11. In an automatically actuated mechanical triangle solving computer wherein an analogue triangle is constrained to conform to input data fixing the magnitude and direction of vectors represented by two sides of said triangle, a mechanism for representing the third or unknown side of said analogue triangle, said mechanism comprising; a double ended arm member centrally pivoted about a point which represents one end of said unknown side; a cursor member adapted for slidable movement along said arm member from one end to the other thereof; said cursor being pivoted upon a mounting pin which represents the other end of said unknown side; spring retained mounting means for said mounting pin arranged to permit limited spring restrained movement thereof away from the point actually representing the one end of said unknown side whenever the forces constraining said triangle have insufficient moment about said point to move said arm member to a position enabling the further constraint of said triangle, and a second spring restrained means arranged to permit limited spring restrained displacement of the pivot point of the arm member away from the point actually representing the other end of said unknown side.

12. A mechanical analogue triangle adapted to be constrained to conform to input data consisting of three known values which may be represented by two sides and the included angle of a triangle and to establish as vector analogues one or more desired unknown values of said triangle from which desired output values may be derived, said triangle comprising; a mounting pin, an arm member freely pivoted centrally in said mounting pin, said arm being formed to accommodate a cursor having an indexing point and which is freely slidable lengthwise of said arm member on both sides of the centrally located pivot point; a cursor accommodated on said arm; said pivot point and said indexing point, when considered together with a third point, representing the three apices of a triangle; a slidable carriage displaceable in a plane parallel to the plane in which said arm member is pivotable said arm member being pivotally mounted on said carriage whereby the displacement of said carriage represents a first side of said triangle; a vector mechanism adapted to be constrained to position a second mounting pin upon which said cursor is pivoted to represent the apex of the triangle subtended by said first side, said vector mechanism and said carriage being relatively positioned so that said third point coincides with the point from which the displacement of the carriage is measured, said vector mechanism including means for displacing said second mounting pin in a direction transverse to the direction of application of constraining force applied thereto when said mounting pin and said pivot point are in alignment and the direction of the constraining force is not in longitudinal alignment with said arm member, whereby said constraining force is given sufficient moment about said pivot point to swing said arm member about said pivot point and said triangle may be constrained by movement of said pin and said carriage to assume all theoretically possible triangle shapes.

13. A mechanical analogue triangle as defined in claim 12 wherein said carriage is provided with spring restrained means arranged to permit limited spring resisted displacement of said carriage from its restrained position.

References Cited in the file of this patent

UNITED STATES PATENTS

| | | |
|---|---|---|
| 2,378,910 | Chafee | June 26, 1945 |
| 2,385,952 | Svoboda | Oct. 2, 1945 |
| 2,528,502 | Florez | Nov. 7, 1950 |
| 2,538,226 | Anderson | Jan. 16, 1951 |
| 2,567,984 | Wood | Sept. 18, 1951 |
| 2,621,855 | Hauser | Dec. 16, 1952 |
| 2,689,083 | Hammond | Sept. 14, 1954 |